United States Patent
Hakeem et al.

(10) Patent No.: US 10,065,602 B2
(45) Date of Patent: Sep. 4, 2018

(54) VEHICLE WITH AUTOMATIC SNOW REMOVAL

(71) Applicant: Ford Global Techonologies, LLC, Dearborn, MI (US)

(72) Inventors: Mohannad Hakeem, Dearborn, MI (US); Umer Khalid, Farmington Hills, MI (US); Mohamed Mattar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 69 days.

(21) Appl. No.: 15/214,127

(22) Filed: Jul. 19, 2016

(65) Prior Publication Data

US 2018/0022317 A1 Jan. 25, 2018

(51) Int. Cl.
*B60S 1/02* (2006.01)
*B60S 1/08* (2006.01)

(52) U.S. Cl.
CPC ............. *B60S 1/023* (2013.01); *B60S 1/0862* (2013.01)

(58) Field of Classification Search
CPC ................................ B60S 1/023; B60S 1/0862
See application file for complete search history.

(56) References Cited

U.S. PATENT DOCUMENTS

| | | |
|---|---|---|
| 7,783,400 B1 | 8/2010 | Zimler |
| 8,180,547 B2 | 5/2012 | Prasad et al. |
| 9,205,826 B2 | 12/2015 | Lee et al. |
| 2007/0056947 A1 | 3/2007 | Damian |
| 2008/0034531 A1* | 2/2008 | Beaver .................. B60S 1/0477 15/250.361 |
| 2009/0120471 A1* | 5/2009 | Ludwiczak ............... B06B 3/00 134/115 R |
| 2009/0294430 A1 | 12/2009 | Andrade |
| 2013/0146093 A1* | 6/2013 | Hertzberg ............... B60S 1/023 134/18 |
| 2014/0306826 A1* | 10/2014 | Ricci ...................... H04W 4/21 340/573.1 |

(Continued)

FOREIGN PATENT DOCUMENTS

| | | |
|---|---|---|
| CN | 202966246 U | 6/2013 |
| DE | 4033332 A1 | 4/1991 |

(Continued)

OTHER PUBLICATIONS

Unpublished pending U.S. Appl. No. 14/991,496, filed Jan. 8, 2016, pursuant to the Commissioner's Notice dated Sep. 21, 2004.

(Continued)

*Primary Examiner* — Khoi H Tran
*Assistant Examiner* — Robert T Nguyen
(74) *Attorney, Agent, or Firm* — James P. Muraff; Neal, Gerber & Eisenberg LLP

(57) ABSTRACT

A vehicle configured to automatically clear snow from windows of the vehicle includes: a prime mover, a first window with a first vibration sensor, processor(s) configured to: control speed or load of the prime mover to increase vibration detected by the first vibration sensor, control the speed or the load of the prime mover, within certain predetermined limits, to maximize vibration detected by the first vibration sensor; accept a user prioritization of the windows; control speed or load of the prime mover based on the user prioritization.

20 Claims, 6 Drawing Sheets

(56) References Cited

U.S. PATENT DOCUMENTS

| | | | |
|---|---|---|---|
| 2015/0345958 A1 | 12/2015 | Graham | |
| 2016/0137166 A1* | 5/2016 | Trevett | B08B 7/028 |
| | | | 134/1 |
| 2016/0229346 A1* | 8/2016 | Oh | B60R 1/12 |
| 2016/0250997 A1* | 9/2016 | Toda | B60S 1/0807 |
| | | | 701/49 |

FOREIGN PATENT DOCUMENTS

| | | |
|---|---|---|
| DE | 102014226358 A1 | 6/2016 |
| JP | 2008114634 A | 5/2008 |

OTHER PUBLICATIONS

Unpublished pending U.S. Appl. No. 15/144,342, filed May 2, 2016, pursuant to the Commissioner's Notice dated Sep. 21, 2004.
Search Report dated Jan. 12, 2018, for GB Patent Application No. GB 1711286.3 (3 pages).

* cited by examiner

VEHICLE WITH AUTOMATIC SNOW REMOVAL

TECHNICAL FIELD

This disclosure relates to systems and methods of removing accumulations, such as snow, from vehicles.

BACKGROUND

Snow accumulates on vehicles parked outside. A driver of the vehicle must often manually remove the accumulation prior to driving the vehicle. A solution is needed to apply existing vehicle technology to automatically remove accumulated snow on the driver's behalf.

SUMMARY

A vehicle configured to automatically clear snow from windows of the vehicle includes: a prime mover, a first window with a first vibration sensor, processor(s) configured to: control speed or load of the prime mover to increase vibration detected by the first vibration sensor; control the speed or the load of the prime mover, within certain predetermined limits, to maximize vibration detected by the first vibration sensor; accept a user prioritization of the windows; control speed or load of the prime mover based on the user prioritization.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
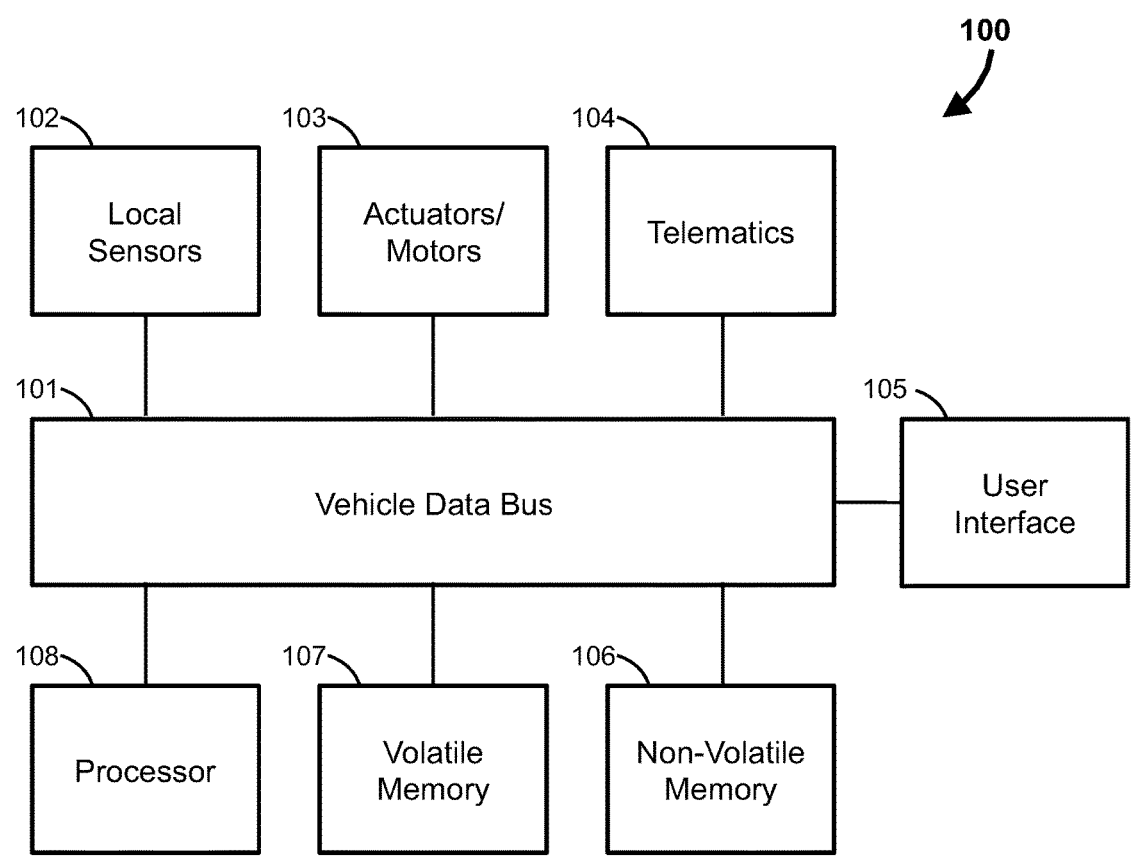
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as the first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The processor 108 may represent multiple processors 108 working sequentially or in parallel. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, windshield wipers, brake light circuits, transmissions, airbags, engines, power train motors, steering, seat vibration motors, airbags, etc. The airbags may have a disabled state and an enabled state. When the airbags are in the disabled state, the airbags cannot deploy. When the airbags are in the enabled state, the airbags will deploy in response to signals from the processors. The local sensors 102 transmit digital readings or measurements to the processor 108. Examples of suitable sensors include temperature sensors, rotation sensors, seatbelt sensors, speed sensors, seatbelt sensors, load sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
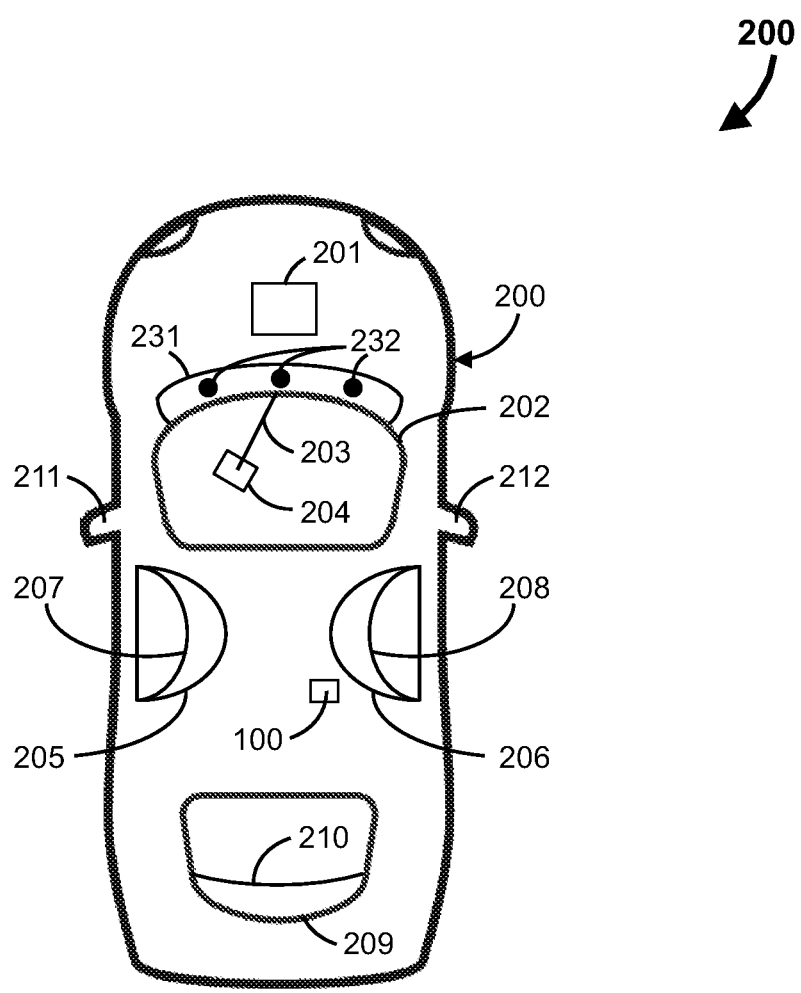
FIG. 2 is a schematic of a vehicle including the vehicle computing system.

FIG. 2 generally shows and illustrates a top plan view of the vehicle 200, which includes the computing system 100. Although not shown, the vehicle 200 is in operative wireless communication with a nomadic device, such as a mobile phone. It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 may perform some or all of the methods and operations discussed below.

According to various embodiments, the vehicle 200 includes some or all of the features of the vehicle 100a of Prasad. According to various embodiments, the computing system 100 includes some or all of the features of the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Returning to FIG. 2, the vehicle 200 includes an engine or motor 201 (i.e., the prime mover 201), configured to draw energy from a power source such as a fuel tank and/or batterie(s), a windshield 202 having a wiper blade 203 with a tip 204, an air channel 231 located below the windshield 202, side mirrors 211 and 212, side windows 205 and 206, and a rear window 209. The side windows 205 and 206 and the rear window 209 include heaters 207, 208, and 210. The windshield 202 and the side mirrors 211 and 212 include similar heaters (not shown).

Figure 4:
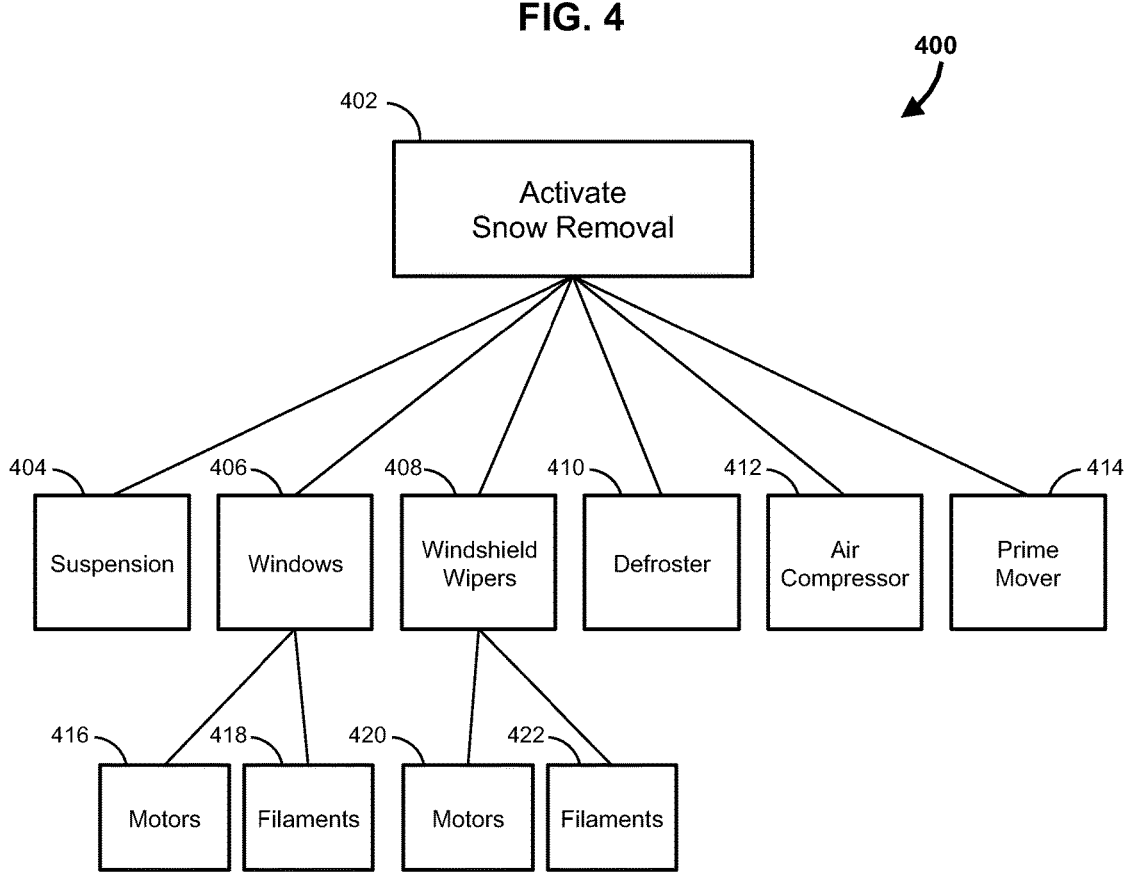
FIG. 4 is a block diagram of a method for controlling various components to clear snow from the vehicle.

FIG. 4 generally shows and illustrates a method 400 of clearing accumulated snow from the vehicle 200. At block 402, the vehicle 200 receives a snow removal command. This command may be generated by the method 500 of FIG. 5 and discussed in detail below. After receiving the snow removal command, the vehicle proceeds to one or more of blocks 404, 406, 408, 410, 412, and 414. The vehicle may select and carry out some or all of these blocks based on results or outputs of the method 500.

According to various embodiments, the vehicle 200 includes a suspension. The suspension includes shocks that operate via a hydraulic circuit. At block 404, the vehicle 200 energizes the shocks. Energizing the shocks may include porting hydraulic fluid from the shocks into the hydraulic circuit. Energizing the shocks causes the vehicle 200 to vertically oscillate (i.e., move up and down).

As stated above, the vehicle 200 includes the windshield 202, the side windows 205 and 206, the rear window 209, and the mirrors 211 and 212 (the windshield 202, the side windows 205 and 206, the rear window 209, and the mirrors 211 and 212 are collectively referred to as "the windows").

Each side window 205 and 206 includes a motor configured to actuate the window 205 and 206 in the vertical direction. Each of the windshield 202, the side windows 205 and 206, the rear window 209, and the mirrors 211 and 212 includes vibrative or haptic motors mounted directly to glass of defining the windows. These motors are configured to oscillate one or more masses to induce vibration. Suitable vibration or haptic motors are known in the art and are mounted, for example, in mobile phones. Suitable vibrative or haptic motors are further described in U.S. patent application Ser. No. 15/144,342, which is hereby incorporated by reference in its entirety.

Upon reaching block 406, the vehicle 200 proceeds to block 416. At block 416, the vehicle 200 actuates some or all of the motors of the windshield 202, the side windows 205 and 206, the mirrors 211 and 212, and/or the rear window 209 to induce vibration. The vehicle 200 opens and closes the side windows 205 and 206 via the vertical motor, thus inducing vibration. The vehicle 200 actuates the vibrative or haptic motors. Oscillations of the mass inside the vibrative or haptic motors are transferred to the glass of the windows, thus inducing vibration. According to various embodiments, the vehicle 200 includes vibrative sensors on each of the windows. The vehicle 200 individually controls each of the vibrative or haptic motors to maximize the sensed vibrations of each vibrative sensor.

As stated above, each of the windows (i.e., the windshield 202, the side windows 205 and 206, the mirrors 211 and 212, and the rear window 209) include heaters (e.g., heaters 207, 208, and 210). According to various embodiments, the heaters are tungsten filaments configured to convert electrical energy to heat. According to various embodiments, the tungsten filaments extend laterally across the windows directly above an interface between the exterior body of the vehicle and the window.

Figure 6:
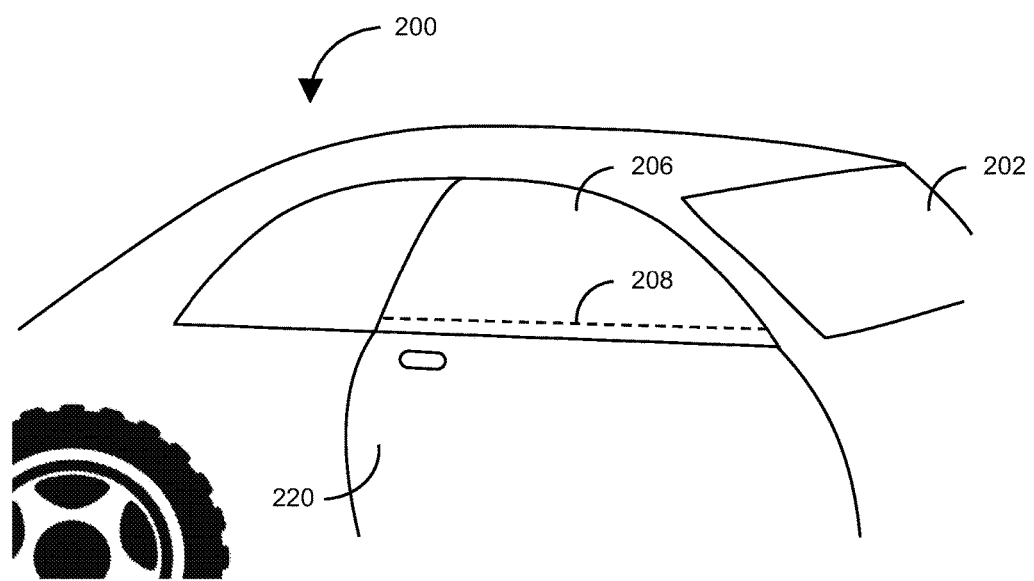
FIG. 6 is a side perspective view of the vehicle.

FIG. 6 is a perspective view of the right side of the vehicle 200, including the side window 206 and the windshield 202. As shown in FIG. 6, the heater 208 extends through the side window 206 at a location directly above (e.g., less than 1, 2, 3, 4, 5, or 10 centimeters above) the interface between the exterior body of the vehicle (e.g., door 220) and the side window 206 when the side window 206 is in the fully closed position. This location advantageously enables the heater 208 to melt snow accumulated on the bottom of the side window 206.

More specifically, when the snow accumulated on the bottom of the side of the window 206 melts, snow positioned above the melted snow will slide down the window 206 under the force of gravity. As a result, the snow will either slide off the vehicle 200, or slide to a position in thermal contact with the heater 208. It should be appreciated that the heaters of the other windows (e.g., the windshield 202, the mirrors 211 and 212, the rear window 209, and the side window 205) are also positioned directly above an interface of the window and the body of the vehicle (i.e., at the very bottom of the window when the window is in a fully closed state).

According to various embodiments, one or more of the above windows (e.g., the side windows 205 206 and the windshield 202) only include heaters located directly above the interface to preserve visibility through the windows and to reduce cost. According to various embodiments, one or more of the above windows only include a single heater located above the interface to preserve visibility and to reduce cost.

Upon reaching block 406, the vehicle 200 proceeds to block 418. At block 418, the vehicle 200 powers the heaters.

As stated above, the heaters, via a tungsten filament, convert the power into heat, which melts accumulated snow. According to various embodiments, the vehicle 200 executes blocks 416 and 418 simultaneously. According to various embodiments, the vehicle 200, when executing block 418 (i.e., energizing the heaters) disables vertical actuation of the windows (e.g., the side windows 205 and 206), but enables vibration of the windows.

At block 408, the vehicle 200 controls the windshield wipers (e.g., wiper 203). More specifically, the vehicle 200 energizes motors connected to the wipers to move the wipers back and forth at block 420. The vehicle 200 also powers tungsten filaments connected to the wipers to melt snow. According to various embodiments, the tip 204 of wiper 203 includes one of the tungsten filaments. According to various embodiments, the tungsten filaments extend along the length of the wipers (e.g., along all of wiper 203). According to various embodiments, the vehicle 200 actuates the motors at block 420 and then detects whether the motors are able to move the wipers or whether the wipers are stuck. The vehicle 200 powers tungsten filaments of stuck wipers, but does not power tungsten filaments of moveable wipers.

At block 410, the vehicle 200 turns on a defroster of the HVAC system. As is known in the art, the defroster blows heated air onto some or all of the windows. At block 412, the vehicle 200 powers an air compressor. The air compressor sucks in ambient air, pressurizes the ambient air, then directs the pressurized air through tubes 232 of the air channel 231. An open end of the tubes 232 faces the windshield 202. The tubes 232 thus direct pressurized air against the exterior surface (i.e., glass) of the windshield 202. According to various embodiments, the air compressor is attached to a flexible tube (e.g., a hose) accessible and movable by a user from an exterior of the vehicle 200. A user may activate the compressor via the user interface 105, causing the compressor to expel air through the flexible tube. The user places an end of the flexible tube near one of the windows. Air expelled from the flexible tube disperses snow. The vehicle 200 may include a storage area for the flexible tube.

At block 414, the vehicle 200 turns on the primary engine or motor 201 (collectively referred to as the prime mover 201) of the vehicle (i.e., the engine or motor that supplies motive power to the vehicle wheels). The vehicle 200 controls the prime mover 201 to induce vibrations in the vehicle 200 and specifically in the windows of the vehicle 200. According to various embodiments, the vehicle 200 controls the prime mover 201 to induce vibrations having a frequency equal to determined resonant frequency of the vehicle. According to various embodiments, the vehicle 200 controls the prime mover 201 to maximize vibration sensed by one or more vibration sensors or accelerometers located on the vehicle (e.g., on some or all of the windows).

U.S. Pat. No. 7,174,879 to Chol, which is hereby incorporated by reference in its entirety, relates to a system and method of operating a prime mover (e.g., an engine) to reduce vibrations (referred to in Chol as "NVH"). According to various embodiments, the vehicle 200 of the present invention generally reverses or inverts the methods described in Chol to intentionally increase vibration or NVH. According to various embodiments, the vehicle 200 of the present invention includes some or all of the features of the vehicle described in Chol.

Figure 3:
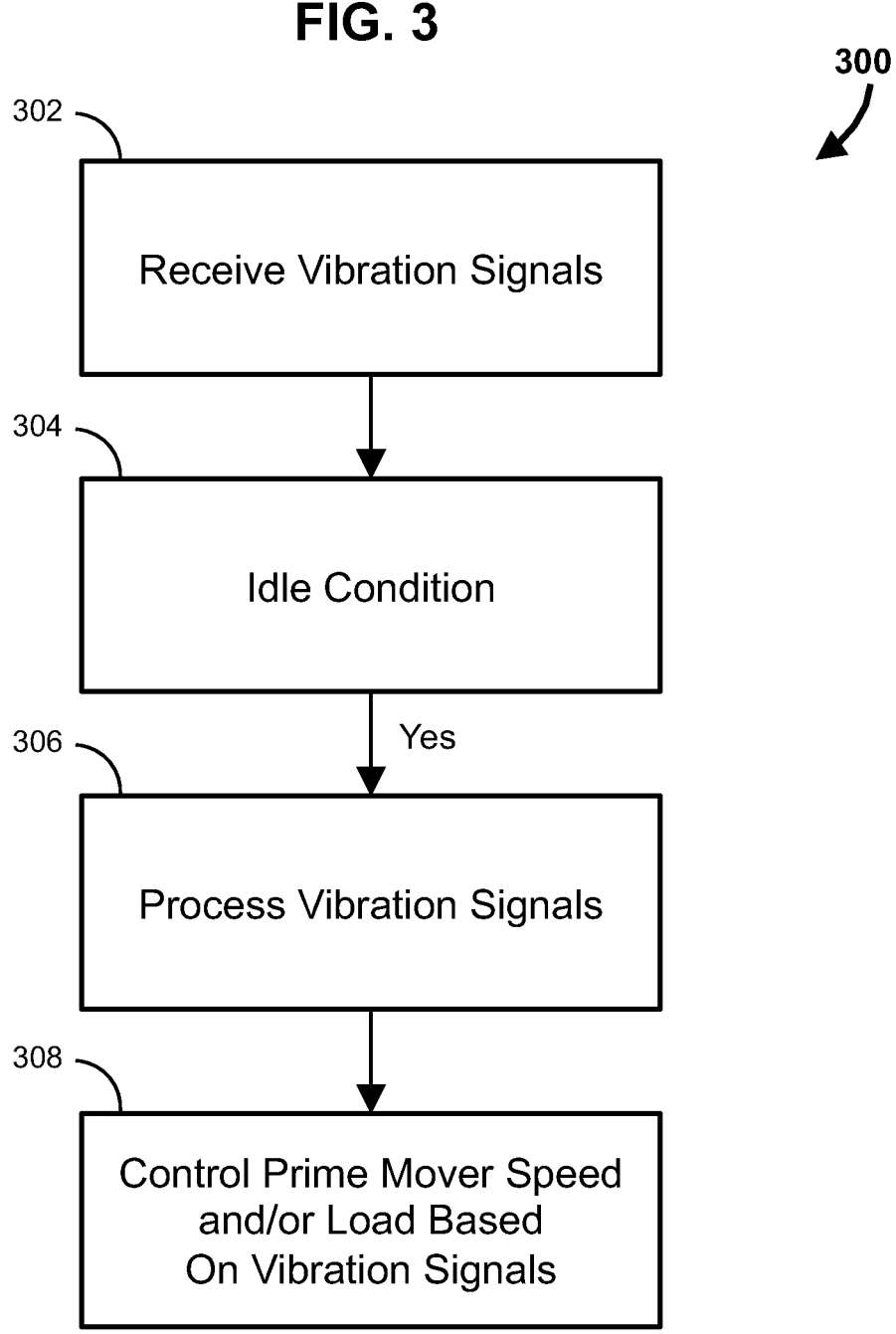
FIG. 3 is a block diagram of a method for maximizing engine vibration. The method of FIG. 3 is triggered by block 414 of FIG. 4.

FIG. 3 generally shows and illustrates a method 300 of intentionally inducing vibration via the prime mover 201. At block 302, the vehicle 200 receives vibration signals from a sensor. The sensor may be a vibration or detonation sensor, such as a known sensor, which is mounted on the powertrain (e.g., on the primary mover 201). The sensor may, as described above, be one or more accelerometers mounted on the windows.

At block 304, the vehicle 200 determines whether the prime mover 201 is in idle. If the answer is yes, then the vehicle proceeds to block 306, where the vehicle 200 processes the vibration signals by comparing the vibration signals to vibration thresholds. At block 308, the vehicle controls the prime mover 201 (e.g., the engine) based on the comparison performed at block 306. More specifically, at block 308, the vehicle controls the prime mover 201 to maintain or increase the received vibration signals such that the vibration signals meet or exceed the vibration thresholds. After block 308, the vehicle 200 returns to block 302 and repeats the method 300.

The vibration thresholds may be preset. The vibration thresholds may be previously measured vibration levels. If the vibration thresholds are previously measured vibration levels, then the method 300 results in a vibration search where the vehicle 200 continuously controls prime mover 201 speed and/or load to maximize vibration within the search parameters.

The vehicle 200 enforces maximum speeds and/or loads on the prime mover 201 as search parameters. These maximum speeds and/or loads may be based on a measured amount of energy remaining for use by the prime mover 201 (e.g., amount of battery remaining or amount of fuel remaining). According to various embodiments, the vehicle 200 only maximizes the vibration up to a certain predetermined maximum vibration level to avoid damaging components of the vehicle 200. According to various embodiments, the vehicle 200 receives vibration signals from non-window components (e.g., vibration signals from sensors mounted on the prime mover, transmission, etc.) and ensures that the vibration measured by these sensors falls below various predetermined maximum (e.g., a maximum prime mover vibration, a maximum transmission vibration, a maximum brake assembly vibration).

According to various embodiments, the vehicle 200 implements a plurality of predetermined speed and/or load configurations for the prime mover 201, and then selects the speed and/or load configuration that (a) maximizes vibration of selected windows, while (b) keeping vibration of the non-window components below their predetermined minimums. As discussed below, the vehicle 200 may maximize vibration of certain windows (e.g., the windshield 202), while ignoring vibration of other windows (e.g., the side mirrors 211 and 212).

Figure 5:
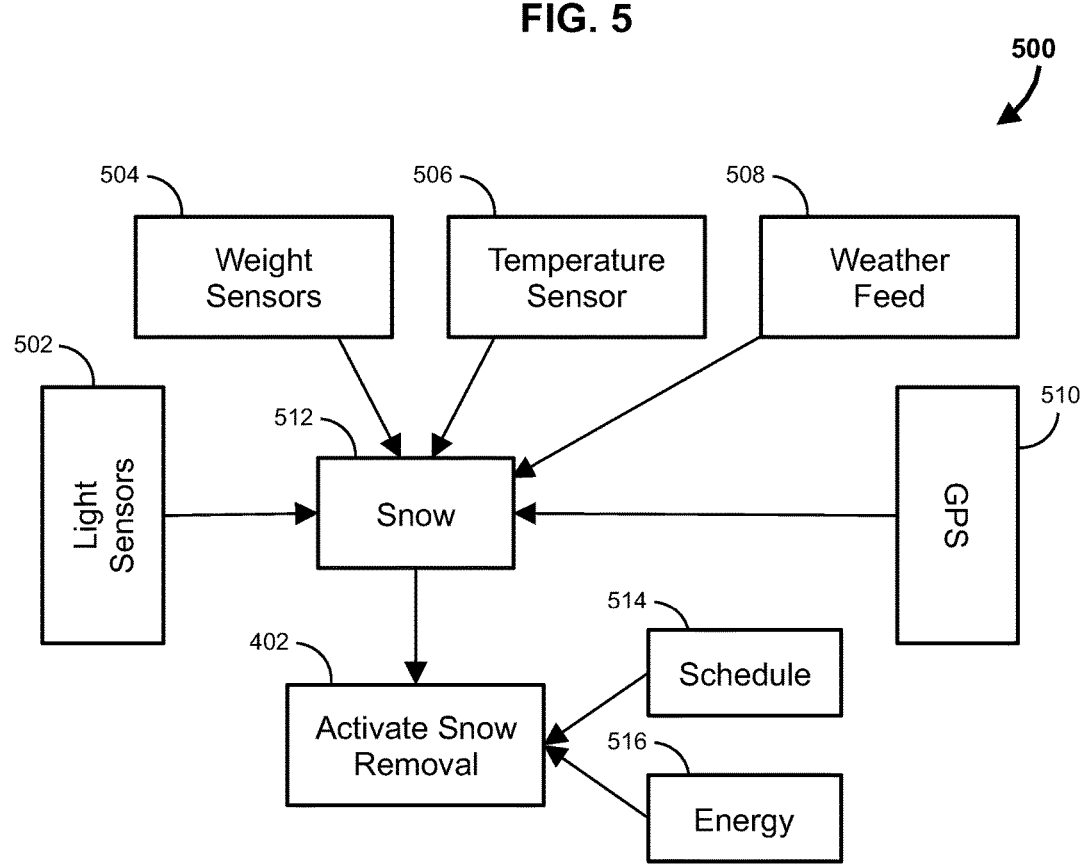
FIG. 5 is a block diagram of a method for activating or engaging the method of FIG. 4.

FIG. 5 generally shows and illustrates a method 500 of automatically activating snow removal (i.e., automatically engaging block 402 of FIG. 4). The method 500 generally includes (a) detecting the presence of snow at block 512 via blocks 502 to 510, (b) consulting a schedule at block 514, (c) determining an amount of energy available at block 516, and (d) activating snow removal at block 402 based on (a), (b), and (c).

At block 502, the vehicle 200 receives signals from one or more light sensors, each configured to sense an amount of light passing through one of the windows. The vehicle 200 compares the sensed amount of light to a predetermined expected amount of light. The vehicle 200 may select the predetermined expected amount of light based on a weather feed, date, time of day, and geographical location. A reduced amount of light passing through the windows (as compared with the expected amount of light) indicates snow on the windows.

At block 504, the vehicle 200 receives signals from one or more weight sensors. The weight sensors may cooperate to find a total weight of the vehicle 200. The vehicle 200 compares a measured weight of the vehicle to an expected weight of the vehicle. The expected weight of the vehicle may be automatically set as the lowest weight of the vehicle recorded since the last door of the vehicle 200 was closed. If the measured weight of the vehicle exceeds the expected weight of the vehicle by a predetermined degree, then the vehicle 200 may assume that snow has accumulated. According to various embodiments, the vehicle 200 only determines the presence of snow at block 512 if the measured weight exceeds the expected weight by the predetermined degree.

At block 506, the vehicle 200 determines temperature of ambient air via a temperature sensor. According to various embodiments, the vehicle 200 only determines the presence of snow at block 512 if the temperature of the ambient air falls below a predetermined minimum temperature (e.g., 37° F.).

At blocks 508 and 510, the vehicle 200 collects weather data from an external weather server based on a GPS location of the vehicle. Based on the weather data and the GPS location, the vehicle 200 determines whether snow is falling on the vehicle 200.

At block 512, the vehicle 200, according to various predetermined algorithms, determines the presence of snow. The predetermined algorithms may reference some or all of blocks 502 to 510. One algorithm determines the presence of snow at block 512 when (a) the temperature of block 506 is below the predetermined temperature, (b) the weight of block 504 exceeds the expected weight, and (c) the weather of blocks 508 and 510 includes snow.

As stated above, the vehicle 200 determines whether to activate snow removal at block 402 based on (a) the presence of snow at block 512, (b) a schedule at block 514, and (c) a measured amount of energy remaining at block 516.

According to various embodiments, the driver of the vehicle 200 inputs an expected driving schedule. The driving schedule includes an expected time that the driver will begin using the vehicle for each day of the week (e.g., 7 am on Monday, 11 am on Saturday). The driving schedule may include, for each expected time, a snow clearing level of importance (e.g., highly important to clear snow on Monday through Friday, less important on Sunday).

According to various embodiments, the vehicle 200 queries an amount of energy remaining at block 516. If the vehicle 200 relies on gasoline, then the amount of energy is positively related to a level of gasoline in the fuel tank. If the vehicle 200 is electric and relies on battery power, then the amount of energy is positively related to battery energy. According to various embodiments, the vehicle 200 always reserves a user-adjustable predetermined amount of energy for driving. Thus, the amount of energy remaining at block 516 may be an amount above the predetermined amount. For example, if the vehicle always reserves 50% of total battery capacity for driving and the battery charge is 60%, then the amount of energy at block 516 would be 60%-50%=10%. The same applies to gasoline energy.

At block 402, the vehicle 200 evaluates the outputs of blocks 512, 514, and 516. Based on the outputs, the vehicle 200 determines whether to activate snow removal (thus proceeding to the block diagram of FIG. 4). It should be appreciated that at block 402, the vehicle 200 may consider the magnitude of the outputs from blocks 512 and 516. More specifically, the vehicle 200 may consider the amount of snow detected at block 512 and the amount of energy remaining at block 516.

It should be appreciated that control at blocks 404 to 422 and 302 to 308 may be based on the results of blocks 512 and 516. More specifically, the vehicle 200 may prioritize snow removal of certain windows (e.g., the windshield 202) when block 516 indicates low energy available. Similarly, the vehicle 200 may only expend energy on windows that are covered with snow. According to various embodiments, the priority level of the windows is user adjustable. For example, the user may assign zero priority to the side mirrors 211 and 212 and a high priority to the windshield 212. In these instances, the vehicle 200 will optimize vibration and perform heating with respect to the prioritized windows.

According to various embodiments, the vehicle 200 is configured to predict ice formation and execute ice deterrence. Ice may form when snow is on the vehicle 200, the temperature is forecast to rise above freezing, and then fall below freezing. Ice may further form when water (e.g., rain) is on the vehicle 200 and the temperature is forecast to fall below freezing.

To deter ice, the vehicle 200 may proceed as follows: (a) detect a presence of liquid water on one of the windows (e.g., the windshield) and (b) determine a forecast of freezing temperatures between the current time and the next scheduled driving time of the driving schedule. The vehicle 200 may detect (a) via liquid sensors (e.g., moisture sensors), via current weather conditions (e.g., rain), or via a current temperature (e.g., above freezing) and past weather conditions (e.g., snow).

The vehicle 200 activates ice deterrence when (a) liquid water has is present and (b) the current weather is freezing. Ice deterrence may include some of the processes (shown in FIG. 4) of snow removal. Ice deterrence may include a second set of processes while snow removal includes a first set of processes. According to various embodiments, ice deterrence includes blocks 406, 408, and 410 but not blocks 404 and 414. According to various embodiments, the vehicle 200 maintains exterior surfaces of user-selected windows (e.g., the windshield) at a predetermined temperature (e.g., above freezing) while the current weather is freezing. According to various embodiments, the vehicle 200 activates the filaments of user-selected windows when performing ice deterrence. It should thus be appreciated that the vehicle 200 may perform the ice deterrence even when snow is not present.

The invention claimed is:

1. A vehicle comprising:
a prime mover, a first window with a first vibration sensor, processor(s) configured to:
control speed or load of the prime mover to increase vibration detected by the first vibration sensor.

2. The vehicle of claim 1, wherein the processor(s) are configured to: control the speed or the load of the prime mover, within certain predetermined limits, to maximize vibration detected by the first vibration sensor.

3. The vehicle of claim 1, comprising a second window with a second vibration sensor, wherein the processor(s) are configured to:
accept a user prioritization of the windows;
control speed or load of the prime mover based on the user prioritization.

4. The vehicle of claim 1, wherein the processor(s) are configured to:

search through a plurality of speeds or loads of the prime mover to find an optimized speed or load that maximizes vibration detected by the first vibration sensor.

5. The vehicle of claim 1, including a prime mover vibration sensor and wherein the processor(s) are configured to:
control the speed or the load of the prime mover such that vibration detected by the prime mover vibration sensor remains below a predetermined limit.

6. The vehicle of claim 1, comprising a second window with a heater strip extending therethough, wherein the heater strip is located directly above an interface between a body of the vehicle and the window, and wherein the window is vertically adjustable via a motor.

7. The vehicle of claim 1, wherein a vibrative motor is mounted to the window, the processor(s) are configured to activate the vibrative motor, and the vibration motor is configured to induce vibration by oscillating a mass.

8. The vehicle of claim 1, wherein the processor(s) are configured to: (a) query a schedule, (b) determine available energy, (c) determine a presence of snow, (d) activate the prime mover based on (a), (b), and (c).

9. The vehicle of claim 8, wherein the processor(s) are configured to determine the available energy by subtracting a predetermined reserve energy amount from a total amount of energy stored in the vehicle.

10. The vehicle of claim 8, wherein the processor(s) are configured to determine the presence of snow based on weather information downloaded from an external server.

11. A method of clearing snow via processor(s) of a vehicle including a prime mover, a first window with a first vibration sensor, the method comprising:
controlling speed or load of the prime mover to increase vibration detected by the first vibration sensor.

12. The method of claim 11, comprising: controlling the speed or the load of the prime mover, within certain predetermined limits, to maximize vibration detected by the first vibration sensor.

13. The method of claim 11, wherein the vehicle includes a second window with a second vibration sensor, and the method comprises:
accepting a user prioritization of the windows via a user interface;
controlling speed or load of the prime mover based on the user prioritization.

14. The method of claim 11, comprising:
searching through a plurality of speeds or loads of the prime mover to find an optimized speed or load that maximizes vibration detected by the first vibration sensor.

15. The method of claim 11, wherein the vehicle includes a prime mover vibration sensor the method comprises:
controlling the speed or the load of the prime mover such that vibration detected by the prime mover vibration sensor remains below a predetermined limit.

16. The method of claim 11, wherein the vehicle includes a second window with a heater strip extending therethough, wherein the heater strip is located directly above an interface between a body of the vehicle and the window, and wherein the window is vertically adjustable via a motor.

17. The method of claim 11, wherein a vibrative motor is mounted to the window, the method comprises activating the vibrative motor, and the vibrative motor is configured to induce vibration by oscillating a mass.

18. The method of claim 11, comprising: (a) querying a user-input schedule, (b) determining available vehicle energy, (c) determining a presence of snow, (d) activating the prime mover based on (a), (b), and (c).

19. The method of claim 18, comprising determining the available energy by subtracting a predetermined reserve energy amount from a total amount of energy stored in the vehicle.

20. The method of claim 18, comprising determining the presence of snow based on weather information downloaded from an external server.

* * * * *